United States Patent
Giaimo et al.

(10) Patent No.: US 7,588,415 B2
(45) Date of Patent: *Sep. 15, 2009

(54) SYNCH RING VARIABLE VANE SYNCHRONIZING MECHANISM FOR INNER DIAMETER VANE SHROUD

(75) Inventors: John A. Giaimo, Weston, FL (US); John P. Tirone, III, Moodus, CT (US)

(73) Assignee: United Technologies Corporation, Hartford, CT (US)

( * ) Notice: Subject to any disclaimer, the term of this patent is extended or adjusted under 35 U.S.C. 154(b) by 431 days.

This patent is subject to a terminal disclaimer.

(21) Appl. No.: 11/185,623

(22) Filed: Jul. 20, 2005

(65) Prior Publication Data

US 2007/0020091 A1  Jan. 25, 2007

(51) Int. Cl.
*F01D 17/16* (2006.01)
(52) U.S. Cl. ..................................... 415/160
(58) Field of Classification Search ................. 415/150, 415/159–166
See application file for complete search history.

(56) References Cited

U.S. PATENT DOCUMENTS

| | | | | |
|---|---|---|---|---|
| 2,917,275 A | * | 12/1959 | Magin | 415/160 |
| 2,933,234 A | * | 4/1960 | Neumann | 415/160 |
| 3,113,430 A | * | 12/1963 | Beale et al. | 415/163 |
| 3,314,654 A | * | 4/1967 | Thenault et al. | 415/160 |
| 4,044,815 A | | 8/1977 | Smashey et al. | |
| 4,812,106 A | * | 3/1989 | Purgavie | 415/160 |
| 4,834,613 A | | 5/1989 | Hansen et al. | |
| 5,024,580 A | | 6/1991 | Olive | |
| 5,039,277 A | | 8/1991 | Naudet | |
| 5,328,327 A | * | 7/1994 | Naudet | 415/160 |
| 5,380,152 A | * | 1/1995 | Sikorski et al. | 415/160 |
| 5,387,080 A | * | 2/1995 | Bouhennicha et al. | 415/150 |
| 6,283,705 B1 | | 9/2001 | Rice et al. | |
| 6,321,449 B2 | | 11/2001 | Zhao et al. | |
| 6,413,043 B1 | | 7/2002 | Bouyer | |
| 6,688,846 B2 | * | 2/2004 | Caubet et al. | 415/160 |
| 6,790,000 B2 | * | 9/2004 | Wolf | 415/165 |
| 6,799,945 B2 | * | 10/2004 | Chatel et al. | 415/160 |
| 6,843,638 B2 | | 1/2005 | Hidalgo et al. | |
| 7,104,754 B2 | * | 9/2006 | Willshee et al. | 415/159 |

\* cited by examiner

*Primary Examiner*—Christopher Verdier
(74) *Attorney, Agent, or Firm*—Kinney & Lange, P.A.

(57) ABSTRACT

A variable vane assembly includes a sync ring mechanism for synchronously rotating an array of variable vanes. The variable vane assembly comprises a drive vane, a synch ring, a vane arm and a plurality of follower vanes and follower arms. An inner diameter end of the drive vane rotates in an inner diameter vane shroud. The synch ring rotates in an inner channel of the inner diameter vane shroud. The vane arm connects the inner diameter end of the drive vane with the synch ring. The plurality of follower vanes are connected to the synch ring by the follower arms. When the drive vane is rotated by an actuation source, the plurality of follower vanes rotate a like amount by the synch ring and follower arms.

14 Claims, 3 Drawing Sheets

SYNCH RING VARIABLE VANE SYNCHRONIZING MECHANISM FOR INNER DIAMETER VANE SHROUD

This invention was made with U.S. Government support under contract number N00019-02-C-3003 awarded by the United States Navy, and the U.S. Government may have certain rights in the invention.

CROSS-REFERENCE TO RELATED APPLICATION(S)

The present application is related to the following copending applications filed on the same day as this application: "RACK AND PINION VARIABLE VANE SYNCHRONIZING MECHANISM FOR INNER DIAMETER VANE SHROUD" by inventors J. Giaimo and J. Tirone III (Ser. No. 11/185,622); "GEAR TRAIN VARIABLE VANE SYNCHRONIZING MECHANISM FOR INNER DIAMETER VANE SHROUD" by inventors J. Giaimo and J. Tirone III (Ser. No 11/185,624); "INNER DIAMETER VARIABLE VANE ACTUATION MECHANISM" by inventors J. Giaimo and J. Tirone III (Ser. No. 11/185,995); "LIGHTWEIGHT CAST INNER DIAMETER VANE SHROUD FOR VARIABLE STATOR VANES" by inventors J. Giaimo and J. Tirone III (Ser. No. 11/185,956). All of these applications are incorporated herein by this reference.

BACKGROUND OF THE INVENTION

This invention relates generally to gas turbine engines and more particularly to variable stator vane assemblies for use in such engines.

Gas turbine engines operate by combusting a fuel source in compressed air to create heated gases with increased pressure and density. The heated gases are ultimately forced through an exhaust nozzle, which is used to step up the velocity of the exiting gases and in-turn produce thrust for driving an aircraft. The heated gases are also used to drive a turbine for rotating a fan to provide air to a compressor section of the gas turbine engine. Additionally, the heated gases are used to drive a turbine for driving rotor blades inside the compressor section, which provides the compressed air used during combustion. The compressor section of a gas turbine engine typically comprises a series of rotor blade and stator vane stages. At each stage, rotating blades push air past the stationary vanes. Each rotor/stator stage increases the pressure and density of the air. Stators serve two purposes: they convert the kinetic energy of the air into pressure, and they redirect the trajectory of the air coming off the rotors for flow into the next compressor stage.

The speed range of an aircraft powered by a gas turbine engine is directly related to the level of air pressure generated in the compressor section. For different aircraft speeds, the velocity of the airflow through the gas turbine engine varies. Thus, the incidence of the air onto rotor blades of subsequent compressor stages differs at different aircraft speeds. One way of achieving more efficient performance of the gas turbine engine over the entire speed range, especially at high speed/high pressure ranges, is to use variable stator vanes which can optimize the incidence of the airflow onto subsequent compressor stage rotors.

Variable stator vanes are typically circumferentially arranged between an outer diameter fan case and an inner diameter vane shroud. Traditionally, mechanisms coordinating the synchronized movement of the variable stator vanes have been located on the outside of the fan case. These systems increase the overall diameter of the compressor section, which is not always desirable or permissible. Also, retrofitting gas turbine engines that use stationary stator vanes for use with variable stator vanes is not always possible. Retrofit variable vane mechanisms positioned on the outside of the fan case interfere with other external components of the gas turbine engine located on the outside of the fan case. Relocating these other external components is often impossible or too costly. Synchronizing mechanisms also add considerable weight to the gas turbine engine. Thus, there is a need for a lightweight variable vane synchronizing mechanism that does not increase the diameter of the compressor section and does not interfere with other external components of the gas turbine engine.

BRIEF SUMMARY OF THE INVENTION

The present invention is directed toward a variable vane assembly for synchronously rotating an array of variable vanes. The variable vane assembly comprises a drive vane, a synch ring, a vane arm and a plurality of follower vanes and follower arms. An inner diameter end of the drive vane rotates in an inner diameter vane shroud. The synch ring rotates in an inner channel of the inner diameter vane shroud. The vane arm connects the inner diameter end of the drive vane with the synch ring. The plurality of follower vanes are connected to the synch ring by the follower arms. When the drive vane is rotated by an actuation source, the plurality of follower vanes rotate a like amount by the synch ring and follower arms.

DETAILED DESCRIPTION

Figure 1:
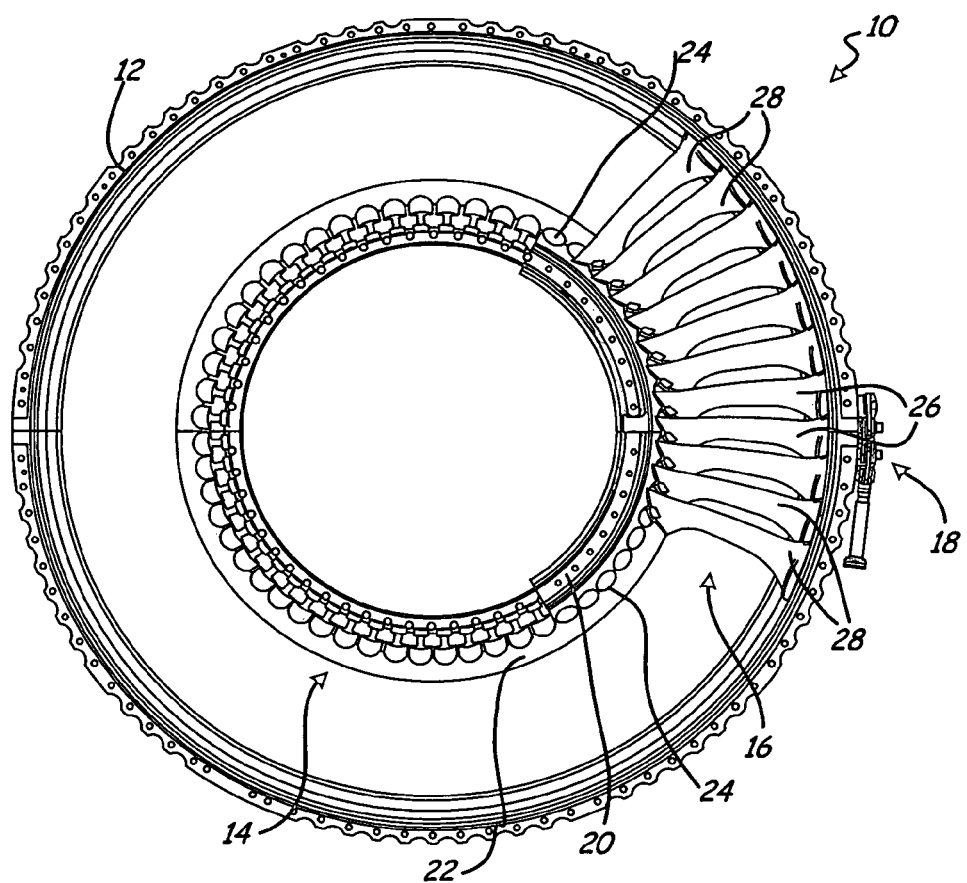
FIG. 1 shows a partially cut away front view of a stator vane section of a gas turbine engine in which the present invention is used.

FIG. 1 shows a partially cut away front view of stator vane section 10 of a gas turbine engine in which the present invention is used. Stator vane section 10 comprises fan case 12, vane shroud 14, variable vane array 16 and actuator 18. Vane shroud 14 is comprised of forward vane shroud component 20 and aft vane shroud component 22, which form inner diameter vane sockets 24. A half-socket, or recess, is located on each of forward vane shroud component 20 and aft vane shroud component 22 to form socket 24. In FIG. 1, only a portion of forward vane shroud component 20 is shown so that the interior of sockets 24 can be seen.

Variable vane array 16 is comprised of drive vanes 26 and a plurality of follower vanes 28. Drive vanes 26 and follower vanes 28 are connected inside inner diameter vane shroud 14 by the synch ring variable vane synchronizing mechanism of the present invention. Thus, when actuator 18 rotates drive vanes 26, follower vanes 28 rotate a like amount.

Typically, follower vanes 28 encircle the entirety of vane shroud 14. Only a portion of variable vane array 16 is shown so that sockets 24 can be seen. Drive vanes 26 and follower vanes 28 are rotatably mounted at the outer diameter of stator vane section 10 in fan case 12, and at the inner diameter of stator vane section 10 in vane shroud 14. The number of drive vanes 26 varies in other embodiments and can be as few as one. In one embodiment, variable vane array 16 includes fifty-two follower vanes 28 and two drive vanes 26. Drive vanes 26 are similar in construction to follower vanes 28. In one embodiment, drive vanes 26 are of heavy duty construction to withstand forces applied by actuator 18.

Inner diameter vane shroud 14 can be constructed in component sizes less than the entire circumference of inner diameter vane shroud. In one embodiment, as shown in FIG. 1, forward vane shroud component 20 is made of sections approximately one sixth (i.e. 60°) of the circumference of inner diameter vane shroud 14. In such a case, two sections have nine half-sockets 24 and one section has eight half-sockets 24. Smaller forward vane shroud components 20 assist in positioning forward vane shroud component 20 under the inner diameter ends of drive vanes 26 and follower vanes 28 when they are inserted in sockets 24. In one embodiment for use in split fan case designs, aft shroud component 22 is made of sections approximately one half (i.e. 180°) the circumference of inner diameter vane shroud 14, in which case each section has twenty six half-sockets 24. The synch ring variable vane synchronizing mechanism of the present invention is constructed in smaller segments, such as approximately one half (i.e. 180°) segments, for use in split fan case designs. Additionally, in other embodiments, forward vane shroud component 20 and aft vane shroud component 22 can be made as full rings (i.e. 360°), along with synch ring variable vane synchronizing mechanism, for use in full ring fan case designs.

Stator vane section 10 is typically located in a compressor section of a gas turbine engine downstream of, or behind, a rotor blade section. Air is forced into stator vane section 10 by a preceding rotor blade section or by a fan. The air that passes through stator vane section 10 typically passes on to an additional rotor blade section. Drive vanes 26 and follower vanes 28 rotate along their respective radial positions in order to control the flow of air through the compressor section of the gas turbine engine. The synch ring variable vane synchronizing mechanism of the present invention coordinates their rotation.

Figure 2:
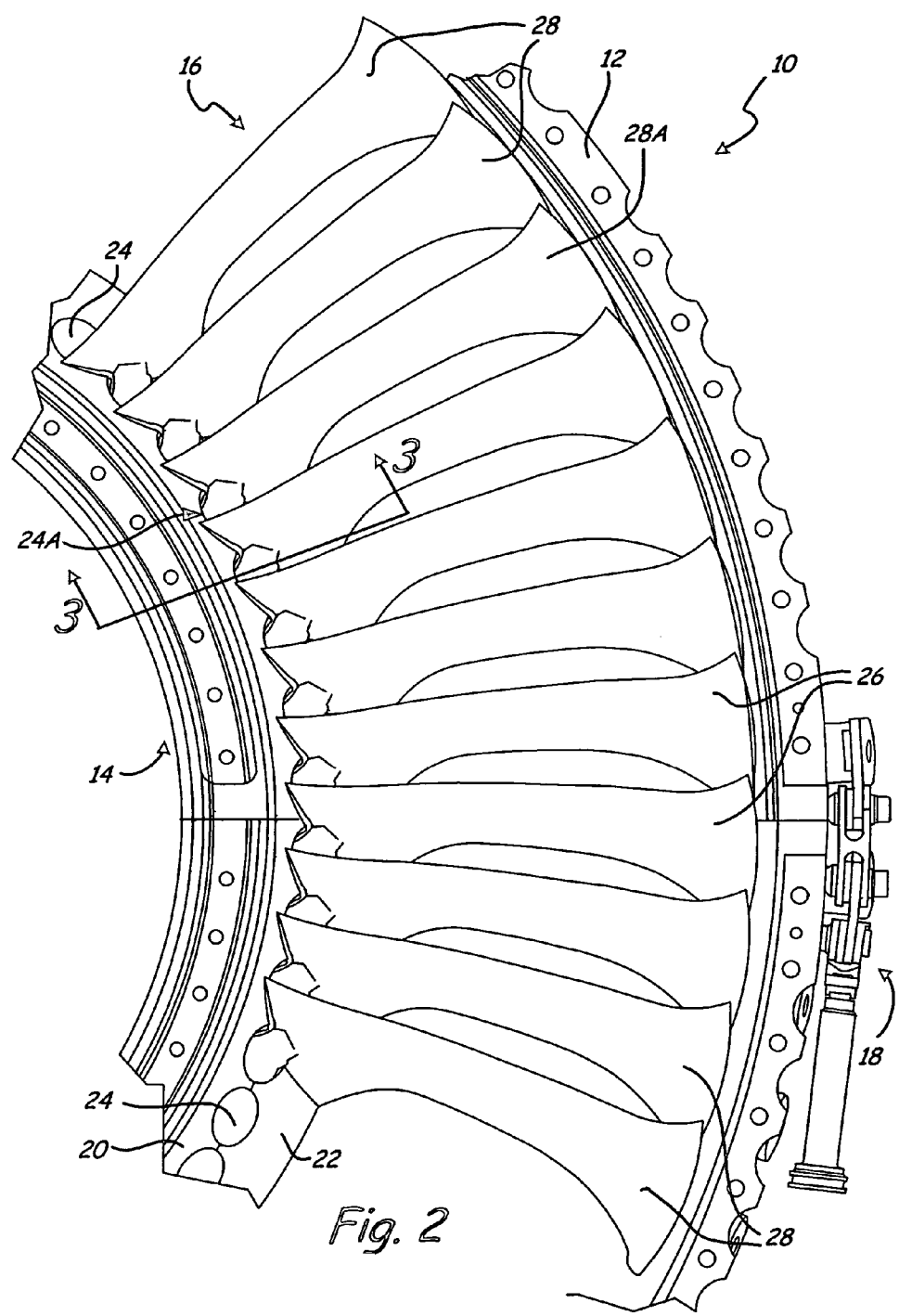
FIG. 2 shows a close up of a portion of stator vane array positioned between a fan case and the inner diameter vane shroud of the present invention.

FIG. 2 shows a close up of a portion of stator vane array 16 positioned between fan case 12 and inner diameter vane shroud 14 of the present invention. Drive vanes 26 and follower vanes 28 are rotatable in sockets 24 of inner diameter vane shroud 14 at an inner diameter end. Drive vanes 26 and follower vanes 28 are rotatable in fan case 12 at an outer diameter end. Section 3-3 is taken at a position along inner diameter vane shroud 14 where inner diameter end of follower vane 28A is inserted in socket 24A. Forward shroud component 20 and aft shroud component 22 come together to form sockets 24 for securing the inner ends of variable vane array 16.

Figure 3:
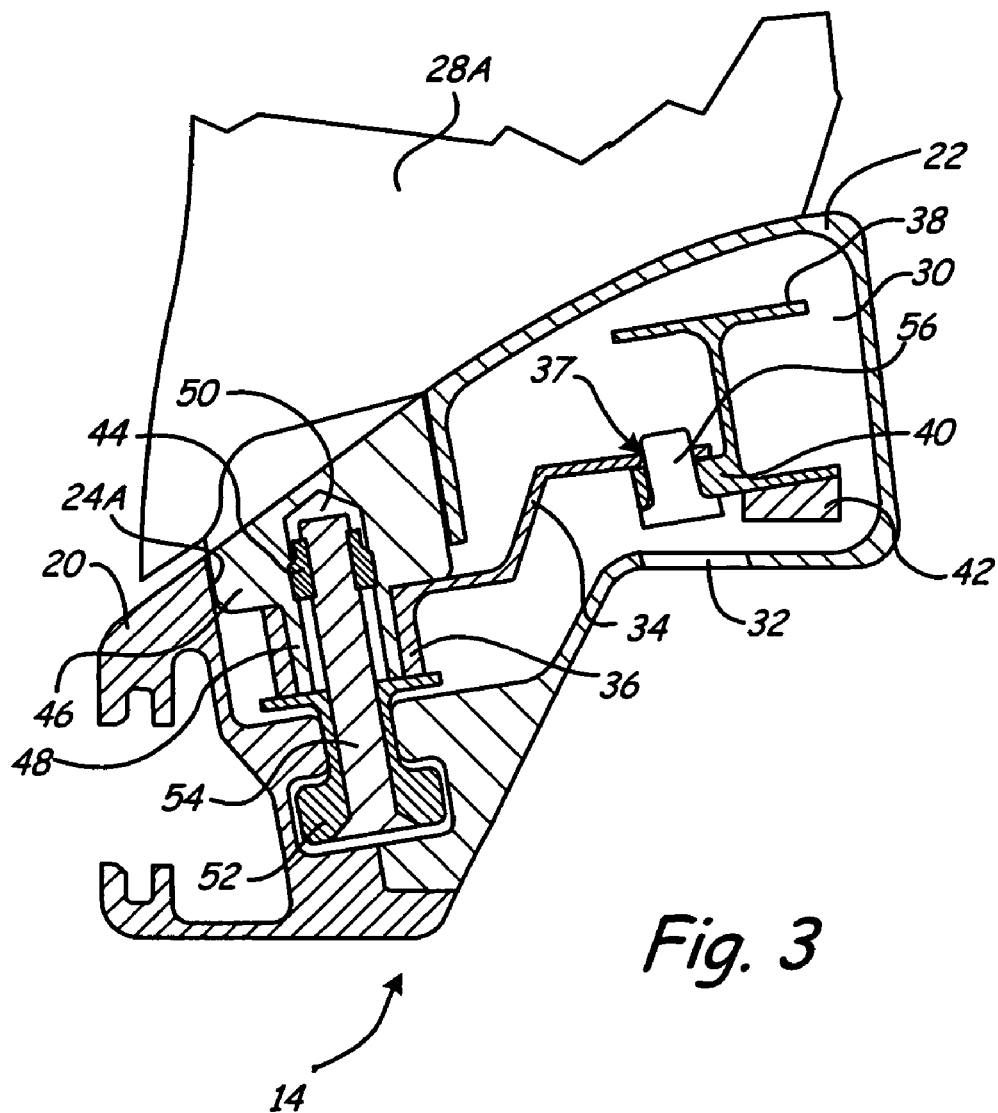
FIG. 3 shows section 3-3 of FIG. 2 showing a cross section of the inner diameter vane shroud at the vane sockets.

FIG. 3 shows section 3-3 of FIG. 2 showing a cross section of inner diameter vane shroud 14 at vane socket 24A. Inner diameter vane shroud 14 includes forward shroud component 20, aft shroud component 22, socket 24A, inner channel 30 and clearance hole 32. Vane arm 34 includes trunnion hoop 36 and pin hole 37. Synch ring 38 includes lug 40 and bumper 42. Follower vane 28A includes locking insert 44, trunnion 46, vane arm post 48 and fastener channel 50.

Locking insert 44 is secured inside of fastener channel 50. Trunnion hoop 36 of vane arm 34 is inserted over vane arm post 48. Button 52 is secured around the head of fastener 54. Fastener 54 is then inserted into fastener channel 50 and threaded into locking insert 44. Button 52 forces trunnion hoop 36 against trunnion 46 and secures it around vane arm post 48. In one embodiment, vane arm post 48 and trunnion hoop 36 have a square profile such that when trunnion hoop 36 is inserted around vane arm post 48 they cannot rotate relative to one another. Follower vane 28A, vane arm 34, fastener 54 and button 52 are installed into fan case 12. This process is repeated for all follower vanes 28 and drive vanes 26. Bumper 42 is positioned on a lower surface of synch ring 38 to assist synch ring 38 in maintaining a circular path through inner channel 30. Synch ring 38 is positioned inside of aft shroud component 22. Aft shroud component 22, along with synch ring 38, is then positioned against trunnions 46. Pin 56 is positioned through clearance hole 32, and into pin hole 37, securely fastening vane arm 34 to lug 40. Pin 56 is tight fitting in lug 40 and vane arm 34 is allowed to pivot at pin 56. The plurality of follower vanes 28 and drive vanes 26 of variable vane array 16 are linked to synch ring 38 in similar fashion.

Forward shroud component 20 is positioned against aft shroud component 22 such that socket 24A fits around button 52. Button 52 is used to pivotably secure follower vane 28A inside socket 24A. Forward shroud component 20 is fastened to aft shroud component 22 as is known in the art.

During operation of synch ring variable vane synchronizing mechanism, actuator 18 rotates drive vanes 26. Vane arms 34 of drive vanes 26 are likewise rotated about trunnion 46. Synch ring 38 is pushed by vane arms 34 of drive vanes 26 and rotates inside inner channel 30. Synch ring 38 thereby pulls vane arms 34 connected to follower vanes 28, which in turn rotates follower vanes 28 the same amount that drive vanes 26 are rotated by actuator 18. Thus, the direction of the flow of air exiting stator vane section 10 can be controlled for entry into the next section of the gas turbine engine utilizing the synch ring variable vane synchronizing mechanism.

The synch ring variable vane synchronizing mechanism of the present invention can be constructed in smaller segments. In one embodiment, synch ring 38 is divided into first and second segments for use in split fan case designs.

Although the present invention has been described with reference to preferred embodiments, workers skilled in the art will recognize that changes may be made in form and detail without departing from the spirit and scope of the invention.

The invention claimed is:

1. A variable vane assembly having a plurality of rotatable stator vanes radially arranged between an inner diameter vane shroud and an outer diameter fan case, the variable vane assembly characterized by:
    the plurality of rotatable stator vanes, each vane comprising;
        a blade portion;
        an outer diameter end for rotating in the outer diameter fan case;
        an inner diameter end for rotating in the inner diameter vane shroud, the inner diameter end comprising:
            a trunnion for rotating within a socket in the inner diameter vane shroud;
            a quadrangular arm post extending generally radially from the trunnion for receiving a vane arm;
            a fastener channel extending generally radially into the arm post and the trunnion;
            a fastener having a head and a shaft, the shaft extending into the fastener channel; and
            a button having an inner channel surrounding a portion of the shaft such that the head of the fastener biases the button against the arm post;
    a synch ring rotatably located in an inner channel defined by the inner diameter vane shroud; and
    a plurality of vane arms connecting the quadrangular arm posts of each stator vane of the plurality of rotatable stator vanes with the synch ring within the inner channel so that the plurality of rotatable stator vanes rotate synchronously.

2. The variable vane assembly of claim 1 wherein the inner diameter vane shroud comprises a forward vane shroud component and an aft vane shroud component disposed adjacent to each other along a split line.

3. The variable vane assembly of claim 2 wherein an interior of the aft vane shroud component includes the inner channel.

4. The variable vane assembly of claim 3 wherein the aft shroud component and the forward shroud component comprise sockets for receiving the inner diameter ends of the plurality of rotatable stator vanes, wherein each vane socket is disposed between the forward and aft vane shroud components and is connected to the inner channel in the aft vane shroud component through a forward facing opening disposed within an interior of the inner diameter vane shroud.

5. A stator vane section for use in a gas turbine engine, the stator vane section comprising:
   an outer diameter fan case;
   an inner diameter vane shroud comprising:
      a forward shroud half having forward vane half-sockets; and
      an aft shroud half having aft vane half-sockets and an inner channel extending through an interior of the aft shroud;
   a synch ring disposed within the inner channel;
   a drive vane comprising:
      a first outer diameter end for rotating in the outer diameter fan case; and
      a first inner diameter end having:
         a first trunnion disposed within one of the forward and aft half-sockets;
         a first arm post extending from the first trunnion; and
         a first fastener channel extending into the first arm post;
   a drive arm disposed within the inner channel for connecting the first inner diameter end of the drive vane with the synch ring, the drive arm comprising:
      a first forward end connected to the first trunnion; and
      a first aft end connected to the synch ring;
   a first fastener inserted in the first fastener channel to secure the drive arm to the first inner diameter end;
   a first button fitted around a head of the first fastener and having a first flange for rotating in the forward and aft half-sockets of the inner diameter vane shroud to secure the drive vane to the inner diameter vane shroud, and a second flange radially displaced from the first flange for engaging the first arm post and biasing the first forward end of the drive vane arm against the first trunnion of the drive vane;
   an actuator for rotating the outer diameter end of the drive vane;
   a plurality of follower vanes each comprising:
      a second outer diameter end for rotating in the outer diameter fan case; and
      a second inner diameter end having:
         a second trunnion disposed within one of the forward and aft half-sockets;
         a second arm post extending from the second trunnion; and
         a second fastener channel extending into the second arm post;
   a plurality of follower arms disposed within the inner channel for connecting the second inner diameter ends with the synch ring, the follower arms each comprising:
      a second forward end connected to one of the second trunnions; and
      a second aft end connected to the synch ring;
   a second fastener inserted in the second fastener channel to secure a follower arm to the second inner diameter end; and
   a second button fitted around a head of the second fastener and having a first flange for rotating in the forward and aft half-sockets of the inner diameter vane shroud to secure the follower vane to the inner diameter vane shroud, and a second flange radially displaced from the first flange of the second button for engaging the second arm post and biasing the forward end of the follower vane arm against a second trunnion of the follower vane;
   wherein when the drive vane is rotated an amount by the actuator, the plurality of follower vanes are rotated a like amount by the synch ring and follower arms.

6. The stator vane section of claim 5 wherein the fastener channels include locking inserts for receiving threaded fasteners.

7. The stator vane section of claim 5 wherein each post has a square cross-section.

8. The stator vane section of claim 7 wherein the forward ends of the drive arm and each of the follower arms include a ring having a square cross-section for connecting to the arm post; and wherein the aft ends of the drive arm and each of the follower arms include a pinned connection to the synch ring.

9. The stator vane section of claim 5 wherein the synch ring includes a bumper to maintain circularity of the synch ring inside the inner channel of the inner diameter vane shroud.

10. The stator vane section of claim 5 wherein the forward half-sockets align with the aft half-sockets along a split line within the inner diameter vane shroud to form sockets, the sockets opening to the inner channel within the aft shroud half.

11. A variable vane for use in a gas turbine engine having an outer diameter fan case and an inner diameter vane shroud, the variable vane comprising:
   a blade portion;
   an outer diameter end for rotating in the fan case;
   an inner diameter end for rotating in the inner diameter vane shroud, the inner diameter end comprising:
      a trunnion for rotating within a socket in the inner diameter vane shroud; a quadrangular arm post extending generally radially from the trunnion for receiving a vane arm;
      a fastener channel extending generally radially into the arm post and the trunnion;
      a fastener having a head and a shaft, the shaft extending into the fastener channel; and
      a button having an inner channel surrounding a portion of the shaft such that the head of the fastener biases the button against the arm post.

12. The variable vane of claim 11 wherein the fastener channel includes a locking insert for receiving threads of the threaded fastener.

13. The variable vane of claim 11 wherein the outer diameter end includes a trunnion for rotating in the outer diameter fan case.

14. The variable vane of claim 11 wherein the button includes a first flange for engaging the arm post and a second flange radially displaced from the first flange for rotating in the socket of the inner diameter vane shroud.

* * * * *

UNITED STATES PATENT AND TRADEMARK OFFICE
CERTIFICATE OF CORRECTION

| | | |
|---|---|---|
| PATENT NO. | : 7,588,415 B2 | Page 1 of 1 |
| APPLICATION NO. | : 11/185623 | |
| DATED | : September 15, 2009 | |
| INVENTOR(S) | : John A. Giaimo et al. | |

It is certified that error appears in the above-identified patent and that said Letters Patent is hereby corrected as shown below:

In Claim 5, Column 5, Line 27, delete "shroud;", insert --shroud half;--

Signed and Sealed this

Eighteenth Day of May, 2010

David J. Kappos
*Director of the United States Patent and Trademark Office*